United States Patent [19]

Miyai et al.

[11] Patent Number: 4,665,049
[45] Date of Patent: May 12, 1987

[54] ADSORBENT FOR LITHIUM AND A METHOD FOR THE PREPARATION THEREOF

[75] Inventors: Yoshitaka Miyai, Takamatsu; Kenta Ooi; Shunsaku Kato, both of Kagawa, all of Japan

[73] Assignee: Director General of Agency of Industrial Science and Technology, Tokyo, Japan

[21] Appl. No.: 828,973

[22] Filed: Feb. 13, 1986

[30] Foreign Application Priority Data

Jun. 5, 1985 [JP]  Japan .................................. 60-122050

[51] Int. Cl.$^4$ ............................................. B01J 20/06
[52] U.S. Cl. ..................................................... 502/400
[58] Field of Search ......................... 502/301, 324, 400

[56] References Cited

U.S. PATENT DOCUMENTS 4,222,897  9/1980  Rollmann ............................ 502/400
4,551,254  11/1985  Imada et al. ..................... 502/400 X

*Primary Examiner*—W. J. Shine
*Attorney, Agent, or Firm*—Hopgood, Calimafde, Kalil, Blaustein & Judlowe

[57] ABSTRACT

The invention provides an adsorbent for lithium in an aqueous medium capable of adsorbing the lithium value even when the concentration of lithium in the aqueous medium is very low as in natural sea water so as to give an adsorbed amount of lithium on the adsorbent comparable to the content in some low-grade lithium ores. The inventive adsorbent is prepared by the steps comprising (a) impregnating a manganese compound with an alkali, e.g. sodium and potassium, or akaline earth, e.g. magnesium and calcium, metal compound by the adsorption of the impregnant in an aqueous solution on to a water-insoluble manganese compound, coprecipitation of manganese and the impregnant element by admixing aqueous solutions of compounds thereof or powder blending of a manganese compound and an impregnant compound, (b) heat-treating the thus impregnated manganese compound at a temperature sufficiently high to form a composite compound between manganese and the impregnant element and (c) leaching the constituent of the impregnant out of the composite manganese compound after the heat treatment using an acid.

16 Claims, No Drawings

ADSORBENT FOR LITHIUM AND A METHOD FOR THE PREPARATION THEREOF

BACKGROUND OF THE INVENTION

The present invention relates to an adsorbent for lithium and a method for the preparation thereof or, more particularly, to an adsorbent for lithium suitable for the recovery of the lithium value from a low-concentration aqueous solution of lithium by the method of adsorption with excellent selectivity, capacity and velocity of lithium adsorption as well as stability and durability in a lithium-containing aqueous solution along with low toxicity and outstanding inexpensiveness and a method for the preparation of such an adsorbent.

As is known, metallic lithium and various kinds of lithium compounds are highlighted in recent years as a material useful in a wide variety of applications including, for example, ceramic materials, dry batteries, absorption refrigerants, medicines and so on. It is expected further that the future demand for metallic lithium and lithium compounds will expand to a large extent in the fields of large-capacity batteries, aluminum-based alloys, fuels in nuclear fusion-type reactors and others consequently with a rapid growth of the overall consumption of lithium materials throughout the world.

Natural resources for lithium production are obtained either from the lithosphere or from the hydrosphere. Namely, ores of several kinds of lithium-containing minerals are known on one hand including spodumene, amblygonite, petalite, lepidolite and the like of which the content of lithium is usually in the range from 2 to 6% while, on the other hand, the waters from certain salt lakes and underground brines containing from 50 to 200 ppm of lithium are also useful as a starting material of lithium production.

The occurrence of these natural resources of lithium, however, is localized on the earth so that some countries, e.g. Japan, are entirely devoid of lithium resources totally depending on imported materials for their lithium production and being confronted by a very serious need for developing a route to obtain lithium sources by themselves. A possibility therefor is, for example, to utilize the naturally occurring watery lithium sources such as certain geothermal underground hot water and hotspring water found in some districts of the country and the sea water available in an infinite volume from the surrounding ocean although the concentration of lithium therein is much lower than in the conventional lithium sources as is only 0.17 ppm in the sea water. Accordingly, the key problem to be solved in this regard is to develop and establish an efficient method for the collection and recovery of the lithium value even from these lithium sources in the form of a low-concentration aqueous solution available in those countries.

Several methods have been proposed for the recovery of the lithium value from a low-concentration aqueous solution of lithium including coprecipitation and adsorption on an adsorbent. For example, a method by the coprecipitation with aluminum hydroxide is proposed in the Preprint I for the 43rd Annual Meeting of the Chemical Society of Japan, page 1240 (1981). The adsorbents for the adsorption of lithium hitherto disclosed include amorphous aluminum hydroxide taught in Kaisui, volume 32, page 78 (1978) and Nippon Kogyokai-shi, volume 99, page 585 (1983), metallic aluminum taught in Bosei Kanri, volume 1982, page 369, hydrated tin oxide taught in Nippon Kogyokai-shi, volume 99, page 933 (1983) and others.

Alternatively, a method for the selective enrichment of lithium in sea water or a salt lake water is taught in Geological Survey Professional Paper, volume 1005, page 79 (1976) according to which the water is concentrated by evaporation utilizing the solar energy to precipitate sodium chloride and other major constituent salts to leave a decreased volume of the mother liquor containing lithium in a relatively increased concentration.

These prior art methods each have their respective disadvantages and problems. For example, the methods by adsorption are generally disadvantageous due to the impractically low capacity and velocity for the adsorption of lithium on the adsorbent from a low-concentration aqueous solution. The method of evaporation utilizing the solar energy is under limitation of the availability of a sufficiently wide area of the plant site and the atmospheric or meteorological conditions in favor of the desired rapid evaporation so that this method is also hardly practicable in countries such as Japan.

To give a more detailed review of the adsorbents for lithium, it is reported that thorium arsenate and tin antimonate have adsorptive power for lithium according to Journal of Inorganic and Nuclear Chemistry, volume 32, page 1719 (1970) and Hydrometallurgy, volume 12, page 83 (1984), respectively, but practical use of these adsrobents still requires improvements in the adsorptivity and development of the method for the desorption of the adsorbed lithium therefrom. Further, Russian investigators have reported in Neorganitscheskii Materialy, volume 9, page 1041 (1973) and volume 12, page 1415 (1976) that various kinds of ion sieve-type adsorbents are useful for the adsorption of lithium although no details are disclosed on the preparation of the adsorbents and the effectiveness thereof for the adsorption of the lithium value in naturally occurring waters.

SUMMARY OF THE INVENTION

An object of the present invention is therefore to provide a novel and improved adsorbent capable of adsorbing the lithium value contained in naturally occurring water, such as sea water, geothermal underground hot water, underground brine and the like, in a low concentration with such a high efficiency that the lithium value can be industrially recovered even from these low grade lithium resources.

More particularly, the object of the invention is to provide an adsorbent for lithium capable of adsorbing lithium even from an aqueous solution thereof in an extremely low concentration with sufficiently high selectivity, velocity and durability or stability in repeated cycles of adsorption and desorption along with low toxicity and inexpensiveness.

Thus, the adsorbent for lithium provided by the invention is prepared by a process comprising the steps of:

(a) impregnating a manganese compound, such as manganese dioxide, manganese hydroxide, manganese carbonate and the like, with an alkali, e.g. sodium and potassium, or alkaline earth, e.g. calcium and magnesium, metal compound to form a uniform mixture;

(b) heating the mixture at a temperature in the range from 500 to 1200° C. or, in some cases, from 300 to 1200° C. depending on the particular method of the step (a); and (c) leaching the alkali or alkaline earth metal compound out of the mixture after the heat treatment in the step (b) with an acid.

DETAILED DESCRIPTION OF THE PREFERRED EMBODIMENTS

As is stated in the above given summarizing description, the first step in the method for the preparation of the inventive adsorbent for lithium is the impregnation of a manganese compound with an alkali or alkaline earth metal compound. This procedure can be carried out in several different ways.

Firstly, a water-insoluble manganese compound is added to an aqueous solution containing an alkali or alkaline earth metal compound, such as a hydroxide or chloride, dissolved therein so as to cause adsorption of the ions of the alkali or alkaline earth metal on the manganese compound followed by the separation of the manganese compound from the solution and drying. In this case, the concentration of the alkali or alkaline earth metal compound in the aqueous solution should be at least 0.01M or, preferably, at least 0.1M. Although the adsorption of alkali or alkaline earth metal ions on the manganese compound may take place even in an aqueous solution of which the concentration of the alkali or alkaline earth metal compound is lower than the above mentioned lower limit, higher concentrations are preferred because the adsorptivity of the resultant inventive adsorbent for lithium would be increased as the content of the adsorbed alkali or alkaline earth metal ions is increased on the manganese compound before the heat treatment. The aqueous solution of the alkali or alkaline earth metal compound should be alkaline and have a pH of 10 or higher. The amount of the adsorbed alkali or alkaline earth metal ions should be 1 to 7% by weight or more or, preferably, at least 1 meq/g of the manganese compound. It is a relatively easy matter to have the adsorbate ions adsorbed in an amount of 3 meq/g of the manganese compound.

The type of the manganese compound used in this procedure of adsorption is not particularly limitative provided that the compound is insoluble in the aqueous solution of the alkali or alkaline earth metal compound exemplified by oxides, hydrated oxides, hydroxides, carbonates and hydrogen-carbonates of manganese, manganese ores including so-called manganese nodules and the like as the examples of suitable ores.

Secondly, an aqueous solution containing a manganese compound, such as chlorides and nitrates of manganese, dissolved therein is admixed under agitation with an aqueous solution of an alkali or alkaline earth metal compound, which is preferably a hydroxide, having a pH of 9 or higher or, preferably, 10 or higher so that coprecipitates are formed in the solution as a manganese compound impregnated with an alkali or alkaline earth metal compound. The content of the alkali or alkaline earth metal element in the precipitates obtained by this method should be in the range from 0.5 to 20% by weight or, preferably, from 1 to 7% by weight. This method of coprecipitation is particularly effective and the adsorbent prepared via this route may have much greater adsorptivity of lithium ions than those prepared by the other methods of impregnation, especially, when the coprecipitant is magnesium hydroxide.

The third method for obtaining a manganese compound impregnated with an alkali or alkaline earth metal compound as the impregnant is a dry process in which a manganese compound in a powdery form is intimately blended with a powder of an alkali or alkaline earth metal compound in a suitable proportion.

Various types of alkali or alkaline earth metal compounds can be used in this case for impregnating a manganese compound without particular limitations provided that the compound can react with the manganese compound by the subsequent heat treatment to form a compound of manganese and the alkali or alkaline earth metal element mostly in the form of a composite oxide including oxides, hydroxide, carbonates, hydrogencarbonates, halides and nitrates as the suitable examples. It should be noted that at least either one of the manganese compound and the alkali or alkaline earth metal compound to be combined together should preferably be an oxide or hydroxide of the element or a compound readily convertible thereinto by the subsequent heat treatment of the mixture. Any of the alkali and alkaline earth metal elements is suitable for the alkali or alkaline earth metal compound although the alkali metal element should preferably be sodium or potassium and the alkaline earth metal element sould preferably be calcium or magnesium in view of the higher efficiency for the adsorption of lithium and less expensiveness. The mixing ratio of the alkali or alkaline earth metal compound to the manganese compound is preferably in the range from 0.3 to 1.5 by moles.

The manganese compound impregnated with an alkali or alkaline earth metal compound obtained in the above described manner is then subjected to a heat treatment in air at a temperature exceeding 500° C. or, preferably, 700° C. or higher up to 1200° C. for a length of time of 0.1 to 10 hours or, preferably, 1 to 3 hours to ensure formation of a compound between manganese and the impregnant element as is mentioned below. Extension of the time for the heat treatment over the above mentioned upper limit has no particular additional advantageous effect. The temperature of the heat treatment can still be lower than 500° C. and down to 300° C. when the manganese compound impregnated with the alkali or alkaline earth metal compound is prepared by the method of coprecipitation.

The above mentioned heat treatment of the manganese compound impregnated with the alkali or alkaline earth metal compound is then followed by leaching of the alkali or alkaline earth metal constituent out of the heat-treated material with an aqueous solution of an acid. The acid should preferably be an inorganic acid such as hydrochloric and nitric acids and the concentration thereof should preferably be at least 0.1M in respect of the relatively high velocity of leaching although any acid solution having a pH of 3 or below may work satisfactorily. The acid leaching is performed preferably to such an extent that the ions of the alkali or alkaline earth element can no longer be detected in the leaching acid. When the acid leaching has been performed to such an extent, it is usual that about 80% or more of the alkali or alkaline earth metal is leached out replacing the metal ions with hydrogen ions while the crystalline structure formed by the heat treatment is retained as such.

The inventive adsorbent for lithium prepared in the above described manner has a very high capacity for the adsorption of lithium even from an aqueous solution of lithium in a very low concentration so that the amount of adsorbed lithium at equilibrium can be as high as 7 mg/g of the adsorbent in sea water which corresponds to a lithium content of 1.5% as lithium oxide $Li_2O$ which is even comparable to the content in several ores of lithium-containing minerals. In addition, the selectivity for the adsorption of lithium thereon is excellent along with the high velocity and capacity of adsorption. The adsorbent of the invention naturally has low toxicity and stability in an aqueous solution so that, even by setting aside the remarkably low costs for the preparation thereof, the inventive adsorbent provides a potential means for the industrial recovery of the lithium value from low-grade resources of lithium such as sea water with high efficiency.

In the following, the inventive adsorbent for lithium is described in more detail by way of examples of the preparation thereof as well as the adsorption test for lithium using the same.

EXAMPLE 1

A powder of manganese dioxide in an amount of 50 g was dipped and kept standing for 5 days at room temperature in 500 ml of a 1 M aqueous solution of sodium hydroxide, potassium hydroxide, calcium chloride or magnesium chloride as the impregnant of manganese dioxide. Thereafter, the manganese dioxide powder was freed from the aqueous solution by filtration and dried at about 70° C. The amount of the alkali or alkaline earth metal compound adsorbed on the manganese dioxide powder was at least 1 meq/g of manganese dioxide for each of the adsorbates. The manganese dioxide powder was then heated in a hot-air oven at 700° C. for 1 hour followed by leaching of the alkali or alkaline earth metal compound therefrom with a 0.1M hydrochloric acid until the alkali or alkaline earth metal compound could no longer be detected in the hydrochloric acid. The acid-leached manganese dioxide powder was washed with water to neutrality and air-dried to give an adsorbent for lithium.

Each 0.8 g portion of the thus obtained manganese dioxide-based adsorbents was suspended for 7 days at room temperature in 100 ml of an aqueous solution at a pH of 8.5 containing 6 ppm of lithium prepared by dissolving lithium chloride in water under agitation and thereafter the concentration of lithium in the supernatant was determined to calculate the amount of lithium adsorbed on the adsorbent. The results are summarized in Table 1 below, in which the distribution coefficient of lithium is a value calculated by use of the following equation.

Distribution coefficient of lithium, ml/g = (adsorbed amount of lithium on the adsorbent at equilibrium, mg/g)/(concentration of lithium in the liquid phase at equilibrium, mg/ml)

TABLE 1

| Test No. | Impregnant | Amount of adsorbed lithium, mg/g | Percentage of adsorbed lithium, % | Distribution coefficient of lithium, ml/g |
|---|---|---|---|---|
| 1 | KOH | 0.28 | 36.7 | 78 |
| 2 | NaOH | 0.30 | 40.0 | 83 |
| 3 | CaCl$_2$ | 0.32 | 43.3 | 94 |
| 4 | MgCl$_2$ | 0.35 | 46.7 | 110 |

EXAMPLE 2

A powder of manganese dioxide in an amount of 50 g was dipped and kept standing for 5 days at room temperature in 500 ml of a 1M aqueous solution of magnesium chloride and then freed from the liquid phase by filtration followed by drying at 60° C. The amount of magnesium adsorbed on the manganese dioxide powder was 3.5 meq/g. Then, each 2 g portion of the manganese dioxide powder was subjected to a heat treatment for 1 hour in hot-air oven kept at a specified temperature of 300° to 700° C. and the magnesium chloride contained therein was leached out using a 1M nitric acid until magnesium ions could no longer be detected in the acid followed by washing of the manganese dioxide powder with water to neutrality and drying to give an adsorbent.

The test for the adsorption of lithium was undertaken in the same manner as in Example 1 with the thus prepared manganese dioxide-based adsorbents to give the results summarized in Table 2 below.

TABLE 2

| Test No. | Temperature of heat treatment, °C. | Amount of adsorbed lithium, mg/g | Percentage of adsorbed lithium, % | Distribution coefficient of lithium, ml/g |
|---|---|---|---|---|
| 5 | 300 | 0 | 0 | 0 |
| 6 | 400 | 0 | 0 | 0 |
| 7 | 500 | 0 | 0 | 0 |
| 8 | 600 | 0.30 | 40.0 | 83 |
| 9 | 700 | 0.35 | 46.7 | 110 |

As is clear from the results shown in Table 2, the temperature of the heat treatment has a critical influence on the adsorptivity of the manganese dioxide-based adsorbent for lithium and the adsorptivity can be exhibited only when the temperature is higher than 500° C.

EXAMPLE 3

An intimate mixture of 3 g of pulverized manganese nodules containing 16% by weight of manganese and 0.4 g of magnesium chloride was heated at 800°C. for 3 hours and then washed with a 0.1M hydrochloric acid to leach out the magnesium compound followed by washing with water and air-drying to give a manganese dioxide-based adsorbent.

Adsorption test of lithium in natural sea water on the thus prepared adsorbent was performed by agitating 0.05 g of the adsorbent in 2 liters of sea water at 25° C. for 7 days and the adsorbed amount of the lithium was calculated from the result of the analysis for the concentration of lithium in the supernatant to find that the adsorbed amount of lithium was 1.20 mg/g adsorbent corresponding to 17.7% of the lithium originally contained in the starting sea water.

EXAMPLE 4

A finely pulverized intimate mixture of 3 g of manganese dioxide and 0.8 g of magnesium chloride was subjected to a heat treatment at 800° C. for 3 hours and then washed with a 0.1M hydrochloric acid to leach out the magnesium compound followed by washing with water and air-drying to give a manganese dioxide-based adsorbent.

A varied amount of the thus prepared adsorbent in the range from 12 to 80 mg was added to 2 liters of natural sea water and agitated for 7 days at 25° C. to establish adsorption equilibrium of lithium on the adsorbent. The amount of the adsorbed lithium was calculated from the results of the analysis for the lithium concentration in the supernatant to give the results shown in Table 3 below. A linear relationship on a logarithmic plot was found between the adsorbed amount of lithium and the concentration of lithium in the supernatant at equilibrium satisfying the Freundlich's adsorption isotherm from which an estimated value of 7.0 mg/g could be obtained as the adsorbable amount of lithium on the adsorbent at equilibrium in the sea water corresponding to a $Li_2O$ content of 1.5% by weight in the adsorbent. This value of lithium content is even comparable to that in a lithium ore of a relatively low grade.

TABLE 3

| Adsorbent added, mg/2 liters | 80 | 50 | 40 | 25 | 12 |
|---|---|---|---|---|---|
| Lithium adsorbed, mg/g | 3.5 | 4.4 | 6.0 | 6.0 | 6.6 |
| Concentration of lithium in supernatant, g/liter | 30 | 60 | 66 | 101 | 131 |

EXAMPLE 5

Manganese hydroxide was finely pulverized and intimately mixed with magnesium chloride, magnesium nitrate, basic magnesium carbonate or magnesium hydroxide each in such a proportion as to give a manganese:magnesium molar ratio of 2:1 and the mixture was heated for 2 hours at a temperature in the range from 300° to 850° C. followed by washing with a 0.1M hydrochloric acid to leach out the magnesium compound and then by washing with water and drying to give an adsorbent.

A 0.05 g portion of each of the thus prepared adsorbents was added to 2 liters of natural sea water and agitated for 7 days at 25° C. followed by the determination of the lithium concentration in the supernatant to calculate the amount of lithium adsorbed on the adsorbent. The results are shown in Table 4 below which gives the adsorbed amount of lithium in mg/g adsorbent accompanied by the value of % adsorption in the respective lower rows in brackets.

TABLE 4

| Magnesium compound | Temperature of heat treatment, °C. | | | | |
|---|---|---|---|---|---|
| | 300 | 400 | 550 | 700 | 850 |
| Magnesium chloride | 0 | 0 | 5.2 | 6.0 | 6.0 |
| | (0) | (0) | (76.5) | (88.2) | (88.2) |
| Magnesium nitrate | 0 | 0 | 0.8 | 5.2 | 5.2 |
| | (1) | (0) | (11.8) | (76.5) | (76.5) |
| Basic magnesium carbonate | 0 | 0 | 0.4 | 5.2 | 5.2 |
| | (0) | (0) | (5.9) | (76.5) | (76.5) |
| Magnesium hydroxide | 0 | 0 | 0.4 | 4.8 | 4.8 |
| | (0) | (0) | (5.9) | (70.6) | (70.6) |

As is understood from the results in this table, the adsorptivity of the adsorbent could be exhibited only when the temperature of the heat treatment was 550° C. or higher regardless of the kind of the magnesium compound.

EXAMPLE 6

Into 100 ml of a 2M aqueous solution of manganese chloride $MnCl_2$ at room temperature were added under agitation 250 ml of an aqueous solution or suspension containing 2 moles of sodium hydroxide, potassium hydroxide, magnesium hydroxide or calcium hydroxide per liter dissolved or dispersed therein. The resultant mixture, in which precipitates were formed, had a pH of about 10. The precipitates in the liquid mixture were aged for 24 hours and then freed from the mother liquor by filtration. The thus collected precipitates were subjected to a heat treatment for 5 hours at a temperature of 150°, 320°, 450°, 630° or 820° C. followed by dipping in a 0.2M hydrochloric acid for 24 hours at room temperature, washing with water by decantation and drying to give an adsorbent.

Each 0.2 g portion of the adsorbents was added to 60 ml of an ammonia-ammonium chloride buffer solution having a pH of 8.5 and containing lithium in a concentration of 6 ppm and agitated for 7 days. The supernatant was analyzed for the concentration of lithium to calculate the amount of lithium adsorbed on the adsorbent and the distribution coefficient in the same manner as in Example 1. The results are shown in Table 5 below.

TABLE 5

| Coprecipitant | Temperature of heat treatment, °C. | | | | |
|---|---|---|---|---|---|
| | 150 | 320 | 450 | 630 | 820 |
| Sodium hydroxide | 18 | 120 | 650 | 1000 | 1000 |
| Potassium hydroxide | 60 | 30 | 27 | 25 | 100 |
| Magnesium hydroxide | 2 | 2 | 300 | 11000 | 35000 |
| Calcium hydroxide | 9 | 100 | 100 | 100 | 100 |

As is shown in Table 5, the adsorbents prepared by using sodium and magnesium hydroxides gave remarkably large distribution coefficients when the temperature of the heat treatment was 450° C. or higher. On the other hand, the distribution coefficients on the adsorbent prepared using potassium or calcium hydroxide were less remarkable although the adsorptivity thereof could be exhibited even when the temperature of the heat treatment was low in comparison with the adsorbents prepared using sodium and magnesium hydroxides.

What is claimed is:

1. A method for the preparation of an absorbent for lithium in an aqueous medium which comprises:
   (a) providing a mixture of a manganese compound with a second compound consisting essentially of an element selected from the group consisting of alkali metal elements and alkaline earth metal elements;
   (b) subjecting said mixture to a heat treatment at a temperature in the range of about 300° to 1200° C. so as to form a product containing said manganese and the element of alkali metal or alkaline earth metal; an
   (c) leaching said alkali or alkaline earth metal constituent from said product after said heat treatment with an aqueous acid solution; thereby providing an absorbent for said lithium.

2. The method as claimed in claim 1, wherein the alkali metal element is sodium or potassium and the alkaline earth metal element is magnesium or calcium.

3. The method as claimed in claim 1, wherein the mixture of the manganese compound with said second compound is obtained by dipping a manganese compound in an aqueous solution of said second compound to cause adsorption of said second compound thereon, the manganese compound being insoluble in water.

4. The method as claimed in claim 1, wherein the mixture in step (a) is provided by admixing aqueous solution of a manganese compound and said second compound to form coprecipitates at a pH of about 9 or higher.

5. The method as claimed in claim 1, wherein the mixture of said manganese compound with said second compound in step (a) is performed by mechanically admixing powders of said manganese compound and said second compound.

6. The method as claimed in claim 3, wherein the manganese compound insoluble in water is selected from the group consisting of manganese oxide, hydrated manganese oxide, manganese carbonate and manganese hydrogencarbonate.

7. The method as claimed in claim 4, wherein the second compound is a hydroxide of an alkali metal element or alkaline earth metal element.

8. The method as claimed in claim 5, wherein at least one of said manganese compound and said second compound is an oxide or hydroxide of the element.

9. The method as claimed in claim 3, wherein the amount of the second compound adsorbed on the manganese compound is in the range of about 0.5 to 7% by weight.

10. The method as claimed in claim 4, wherein the amount of said second compound in the coprecipitates is in the range of about 1 to 20% by weight.

11. The method as claimed in claim 5, wherein the mixing ratio of said second compound to the manganese compound is such that the molar ratio of the element of the alkali or alkaline earth metal in the second compound to the manganese element in the manganese compound is in the range of about 0.3 to 1.5.

12. The method as claimed in claim 3, wherein the temperature of the heat treatment of the mixture is in the range of about 500° to 1200° C. and the heat treatment is performed for a length of time in the range of about 0.1 to 10 hours.

13. The method as claimed in claim 4, wherein the heat treatment is performed for a length of time in the range of about 0.1 to 10 hours.

14. The method as claimed in claim 5, wherein the temperature of the heat treatment of the mixture is in the range of about 500° to 1200° C. and the heat treatment is performed for a length of time in the range of about 0.1 to 10 hours.

15. The method as claimed in claim 1, wherein the aqueous acid solution in the step (c) has a pH of 3 or below.

16. An adsorbent capable of adsorbing lithium ions from an aqueous solution thereof prepared in a method which comprises the steps of:
   (a) providing a mixture of a manganese compound with a second compound of an element selected from the group consisting of alkali metal elements and alkaline earth metal elements;
   (b) subjecting the mixture to a heat treatment at a temperature in the range of about 300° to 1200° C. so as to form a product containing said manganese and an element of alkali metal or alkaline earth metal of said second compound; and
   (c) leaching said alkali or alkaline earth metal constitutent from said product after said heat treatment with an aqueous acid solution; thereby providing an absorbent for said lithium.

* * * * *

UNITED STATES PATENT AND TRADEMARK OFFICE
CERTIFICATE OF CORRECTION

PATENT NO. : 4,665,049
DATED : May 12, 1987
INVENTOR(S) : Yoshitaka Miyai, et al.

It is certified that error appears in the above—identified patent and that said Letters Patent is hereby corrected as shown below:

In claim 9, third line, kindly delete "0.5" and insert therefor --1--.

In claim 10, third line, kindly delete "1" and insert therefor --0.5--.

Signed and Sealed this

Eighteenth Day of August, 1987

Attest:

DONALD J. QUIGG

Attesting Officer

Commissioner of Patents and Trademarks